United States Patent [19]

Coran

[11] Patent Number: 5,096,978
[45] Date of Patent: Mar. 17, 1992

[54] VULCANIZABLE SYNTHETIC RUBBER COMPOSITIONS CURE-ACTIVATED BY SUBSTITUTED UREAS

[75] Inventor: Aubert Y. Coran, Akron, Ohio

[73] Assignee: Monsanto Company, St. Louis, Mo.

[21] Appl. No.: 252,323

[22] Filed: Oct. 3, 1988

[51] Int. Cl.⁵ ............................................. C08C 19/22
[52] U.S. Cl. .................................... 525/346; 525/347
[58] Field of Search ............................... 525/346, 347

[56] References Cited

U.S. PATENT DOCUMENTS 1,904,573  4/1933  Tuley .
2,812,373  11/1957  Zerbe .
3,692,719  9/1972  Srail ................................. 525/356

Primary Examiner—Christopher Henderson
Attorney, Agent, or Firm—Gordon B. Seward; Daniel J. Hudak

[57] ABSTRACT

Synthetic rubber compositions are disclosed which have improved properties of scorch delay and cure rate. Substituted urea coactivators are generally used in addition to a conventional accelerator.

17 Claims, 1 Drawing Sheet

VULCANIZATION PARAMETERS

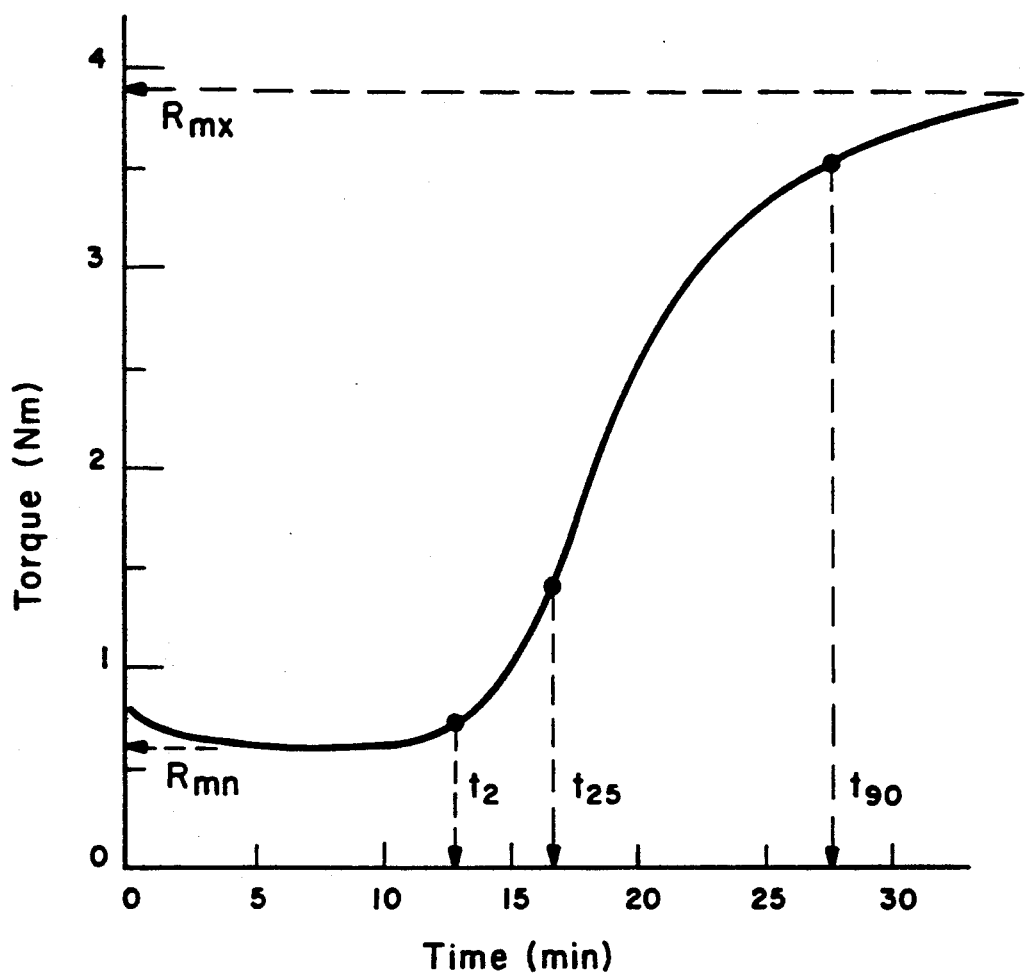
VULCANIZATION PARAMETERS

VULCANIZABLE SYNTHETIC RUBBER COMPOSITIONS CURE-ACTIVATED BY SUBSTITUTED UREAS

FIELD OF THE INVENTION

The present invention relates to compositions containing vulcanizable synthetic rubber which, upon heating to vulcanization temperatures for an appropriate time, show improvement in scorch delay and cure rate. More specifically, the present invention relates to such compositions each of which contains a substituted urea coactivator therein.

BACKGROUND

U.S. Pat. No. 1,904,573 to Tuley relates to the treatment of natural rubber in the presence of an organic accelerator. More specifically Tuley relates to a substantial reduction in compounding cost by reducing the customary amounts of organic accelerators and using in supplantation thereof inexpensive and substantially neutral acid amides such as urea.

U.S. Pat. No. 2,812,373 to Zerbe relates to apparently unreacted mixtures of urea and various compounds such as carboxylic acids, straight-chain paraffins, mercaptans, and alkyl amines to yield an adduct of urea which acts as an activator capable of assisting primary organic vulcanization accelerators.

BRIEF DESCRIPTION OF THE INVENTION

It has now been surprisingly found that combinations of conventional vulcanization accelerators and cross-linking agents in vulcanizable synthetic rubbers with substituted urea coactivators produce unexpected improvements in the vulcanization behavior of the rubbers, especially with regard to cure rates such as indicated by $t_{90}-t_2$ values and especially $t_{25}-t_2$ values. The substituted ureas of the present invention provide synthetic rubber compositions each of which has an increased rate of cure with very little increase in scorch rate and very little increase in the modulus of the cured compositions. Increased cure rates are very desirable since faster rates of production of rubber articles can thus be obtained. Molded rubber articles can be removed from the mold at earlier times without the danger of undercures. While it is always possible to increase the cure rate of a rubber compound (up to a point) by using combinations of accelerators and/or higher levels of accelerators, these changes are often accompanied by unacceptable losses of scorch delay or unacceptable increases in the moduli of the vulcanized articles.

BRIEF DESCRIPTION OF THE DRAWING

The drawing is a typical rheograph showing the parameters of vulcanization.

DETAILED DESCRIPTION OF THE INVENTION

The sulfur-vulcanizable synthetic rubbers which are useful in the compositions of the present invention include butadiene homopolymers such as those made from 1,3-butadiene, and copolymers made from 1,3-butadiene monomer and a vinyl substituted aromatic comonomer having from 8 to 12 carbon atoms, such as styrene or alpha-methyl styrene. The butadiene-styrene copolymers preferably contain minor amounts of styrene and major amounts of butadiene. Such preferred copolymers are known as SBR copolymers. Both solution-polymerized and emulsion-polymerized polymers are included. Butadiene homopolymers include those having predominantly cis-1,4 microstructure, and homopolymers having substantial contents of trans-1,4 or 1,2 microstructure as well as cis-1,4 microstructure. The butadiene polymers used in the invention are preferably "elastomeric" materials; that is they conform, when vulcanized, to the definition of an elastomeric or rubbery material found in ASTM D 1566. Another class of synthetic rubbers which can be used in the present invention are EPDM rubbers. These are polymers made from ethylene, propylene, and a non-conjugated diene monomer. EPDM rubbers generally are not preferred according to the present invention.

Vulcanizable compositions of the butadiene polymers and EPDM polymers contain sulfur and vulcanization accelerators. The rubber polymers of the present invention can also be crosslinked by sulfur donors such as dimorpholinodisulfide and the various alkyl phenol disulfides. Typically, lower amounts of sulfur produce vulcanizates having lower crosslink densities and a resultant low "state of cure." Very high amounts of sulfur, conversely, produce vulcanizates having high crosslink densities and a resultant high "state of cure." Extremely high sulfur levels result in "hard rubber" or ebonite. Preferred sulfur levels in the butadiene polymers are from 0.2 to 4 parts by weight per 100 parts by weight of polymer. When EPDM polymers are utilized, the amount of sulfur or sulfur donors is proportional to the amount of diene therein.

Accelerators are commonly used in vulcanization. Many of them give delayed scorch times upon heating (before the onset of vulcanization). Such accelerators are well known to the art and to the literature and include a large number of known materials. Typical accelerators are listed in the "Rubber World Bluebook." Accelerators which can be used in the present invention include the various thiazoles, such as 2-mercaptobenzothiazole and benzothiazyl disulfide; benzothiazyl sulfenamides, such as N-cyclohexylbenzothiazylsulfenamide, N,N-dicyclohexylbenzothiazylsulfenamide, N,N-diethylbenzothiazylsulfenamide, N,N-diisopropylbenzothiazylsulfenamide, N-oxydiethylenebenzothiazylsulfenamide, N-isopropylbenzothiazylsulfenamide and N-t-butylbenzothiazylsulfenamide. When EPDM rubber is vulcanized, a thiazole accelerator is generally used in combination with a thiuram accelerator. Improved cure rates are obtained when a substituted urea coactivator of the present invention is added to the vulcanizable mixture. Examples of thiuram accelerators include N,N'-dimethyl-N,N'-diphenylthiuram disulfide, dipentamethylenethiuram hexasulfide, tetrabutylthiuram monosulfide, tetraethylthiuram disulfide, tetrabutylthiuram disulfide, tetramethylthiuram disulfide, and metal salts of the corresponding dithiocarbamic acids, such as those of zinc, copper, tellurium, etc.

The amount of the vulcanization accelerators used in the rubber compositions of the present invention is desirably from about 0.05 to about 5 parts by weight, preferably from about 0.2 to about 2 parts by weight, and more preferably from about 0.25 to 2.5 parts by weight per 100 parts by weight of rubber (phr).

In addition to the above compounds, the synthetic rubber compositions of the present invention can contain other conventional compounding ingredients well known to the art and to the literature. For example, various fillers and reinforcing agents, such as clay, silica, and carbon black, can be utilized in amounts up to about 200 phr. Various oils, for example aromatic, naphthenic, or paraffinic, can be utilized to plasticize the rubber in amounts up to about 200 phr. Various activators such as zinc oxide, stearic acid, and the like, can also be used in amounts up to about 15 or more phr. Various antidegradants, and the like, can also be utilized. Such materials are generally mixed into the rubber by utilizing a mill, a Banbury mixer, or the like.

The coactivators of the present invention are substituted urea compounds having the formula

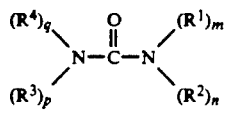

where m is 1, or 0, n is 1, or 0, where p is 1, or 0, wherein q is 1, or 0, and the sum of $m+n+p+q$ equals 1, 2 or 3. Thus, the urea will contain at least one hydrocarbon "R" group therein. It is understood that any otherwise unfilled valences on the N atoms of these compounds will contain hydrogen. Each of $R_1$, $R_2$, $R_3$, and $R_4$, independently, can be an aliphatic group, an aromatic group, or a combination thereof having from 1 to 18 carbon atoms and desirably from 3 to 12 carbon atoms, or an aminoalkyl group having from 1 to 8 carbon atoms, or a pyridyl group, or an alkyl-substituted pyridyl group wherein the alkyl substituent contains from 1 to 6 carbon atoms, or a pyridyl-substituted alkyl group wherein said alkyl group contains from 1 to 6 carbon atoms. An alkyl group having from 3 to 8 carbon atoms is preferred. In a preferred structure, only one such alkyl group exists so that the sum of $m+n+p+q$ equals 1. Together, $(R^1)m$ combined with $(R^2)n$ can be -X-. Alternatively, $(R^2)n$ combined with $(R^3)p$ can be -Y-. The -X- and -Y- groups can be 1) alkylene groups having from 3 to 18 carbon atoms, with from 3 to 8 carbon atoms being desired; or 2) a divalent aliphatic group having from 3 to 18 carbon atoms and desirably from 3 to 8 carbon atoms containing an oxygen or a nitrogen atom therein, or said oxygen or nitrogen containing aliphatic group having a) a 1 to 6 carbon atom alkyl substituent, b) an aromatic substituent, or c) a 7 to 12 carbon atom alkyl-substituted aromatic substituent. Examples of specific substituted urea coactivators include n-butylurea; 1-(2-pyridylmethyl)urea; 1,1-dimethylurea; 1-(2-pyridyl)urea; N-carbamoylpiperidine; amylurea; N-(2-ethyl)butylurea; N-hexylurea; N-octylurea; methylurea; t-butylurea; N-(5-methyl-2-pyridyl)urea; 1,1-diethylurea; N-(3-methyl-2-pyridyl)urea; cyclohexylurea; 2-(N-butylcarbamoyl)-1,2,3,4-tetrahydroisoquinoline; N-(4-methyl-2-pyridyl)urea; 1,3-diethylurea; 1-(4-pyridylmethyl)urea; N-(3-dimethylaminopropyl)urea; N-carbamoylmorpholine; N-carbamoylpiperidine; N-ethylurea; propylurea; N-(2-pyridylethyl)-urea; N-(4-methyl-2-pyridyl)urea; 1-(3-pyridylmethyl)urea; 3-(N-carbamoylpiperazinyl)propionic acid, butyl ester; N-dodecylurea; 1-(3-pyridyl)urea; 1,3-di-(2-pyridyl)urea; allylurea; 1,3-dimethylurea; and octadecylurea. Preferred substituted urea compounds include n-butylurea, t-butylurea, propylurea, amylurea, N-(2-ethyl)butylurea, N-hexylurea, N-octylurea, N-carbamoylpiperidine, N-carbamoylmorpholine, 1-methyl-4-carbamoylpiperazine, 1-phenyl-4-carbamoylpiperazine, N-(5-methyl-2-pyridyl)urea, and N-(3-methyl-2-pyridyl)urea.

The amount of the substituted urea coactivator used in the rubber compositions of the present invention is generally from about 0.05 to about 10 parts by weight, preferably from about 0.15 to about 5.0 parts by weight, and more preferably from about 0.25 to 2 parts by weight phr. These amounts are generally in addition to the normal or conventional amounts of the conventional accelerator. In other words, they generally do not replace or supplant the amount of the conventional accelerator. However, minor reductions in the conventional amount of accelerator or sulfur may be required.

The rubber compositions of the present invention can be used in a large number of applications including tires, especially in the tread and shoulder portions thereof.

The various urea substituted coactivators of the present invention were tested in accordance with appropriate ASTM procedures for rubber. Parameters which characterize vulcanization were taken from ODR (oscillating die rheometer) cure curves ("rheographs"), which were obtained for vulcanization at 153° C., according to FIG. 1. The parameters Rmn and Rmx are the minimum rheometer torque (before the onset of vulcanization) and the maximum rheometer torque (due to vulcanization), respectively. The parameter t2 is the time required for an increase (over Rmn) in rheometer torque of 2.2 dNm (2.0 inlb); t25 is the time required for the occurrence of 25 percent of the increase in torque due to vulcanization (time at $R/(Rmx-Rmn)=0.25$); t90 is the time required for the occurrence of 90 percent of the increase in torque due to vulcanization (time at $R/(Rmx-Rmn)=0.90$). Vmax is the maximum slope of the vulcanization curve, expressed in terms of RmxRmn per minute.

The invention will be better understood by reference to the following examples in which all parts are by weight and all temperatures are in degrees celsius, unless otherwise specified.

EXAMPLE 1

A synthetic rubber masterbatch was prepared. The synthetic rubber was SBR-1500.

| SBR Masterbatch | |
|---|---|
| SBR-1500 | 100.0 |
| Carbon black N-330 | 50.0 |
| Circosol 4240 | 10.0 |
| Zinc oxide | 4.0 |
| Stearic acid | 2.0 |
| | 166.0 |

The SBR Masterbatch was prepared by mixing the above-noted components in a Banbury mixer according to the standard techniques. Subsequently, a substituted urea coactivator of the present invention along with sulfur, an accelerator, and an antiozonant were added on a roll mill in the amounts set forth hereinbelow and blended by using standard techniques.

| SBR Masterbatch | 166.0 |
|---|---|
| SANTOFLEX 13 | 2.0 |
| SANTOCURE MOR | 1.2 |
| Sulfur | 2.0 |
| Coactivator | 2.0 |
| | 173.2 |

SBR-1500 is a cold, non-pigmented elastomer styrene butadiene rubber containing 23.5 percent target bound styrene;

SANTOFLEX®13 is N-(1,3-dimethylbutyl)-N'-phenyl-paraphenylenediamine, an antiozonant; and SANTOCURE®MOR is 2-(Morpholinothio)benzothiazole, an accelerator.

In a similar manner, a natural rubber Masterbatch was made.

| Natural Rubber Masterbatch | |
|---|---|
| Natural Rubber | 100.0 |
| Carbon Black N-330 | 50.0 |
| Naphthenic Oil; Circosol 4240 | 5.0 |
| Zinc Oxide | 5.0 |
| Stearic acid | 2.0 |
| | 162.0 |

The natural rubber Masterbatch was blended with the following compounds according to standard techniques.

| | |
|---|---|
| NR Masterbatch | 162.0 |
| SANTOFLEX 13 | 2.0 |
| SANTOCURE MOR | 0.6 |
| Sulfur | 2.5 |
| Coactivator | 2.0 |
| | 169.1 |

Test data are summarized in Table I. The control stock contains no substituted urea coactivator. However, in each case, the control stock which contains no activator was prepared from the same batch of masterbatch as was the experimental stock and was measured in the same set on the same day as was the experimental stock.

TABLE I

| ODR DATA AT 153° C. | | | | |
|---|---|---|---|---|
| Type of Rubber | Control | n-Butylurea | Control | t-Butylurea |
| SBR | | | | |
| Rmax, Nm | 4.00 | 4.10 | 3.87 | 4.35 |
| t2, min. | 15.8 | 5.8 | 13.3 | 7.7 |
| t90-t2, min. | 15.5 | 6.8 | 16.4 | 8.8 |
| t25-t2, min. | 3.4 | 1.2 | 3.7 | 1.6 |
| Max Velocity, %/Min. | 10.8 | 27.6 | 10.1 | 21.0 |
| NATURAL RUBBER | | | | |
| Rmax, Nm | 3.40 | 4.10 | 3.60 | 4.56 |
| t2, min. | 5.0 | 2.5 | 5.2 | 3.3 |
| t90-t2, min. | 7.7 | 5.7 | 8.1 | 5.2 |
| t25-t2, min. | 1.3 | 0.8 | 1.6 | 0.9 |
| Max Velocity, %/Min. | 18.2 | 32.9 | 17.1 | 30.4 |

| Type of Rubber | Control | n-Amylurea | Control | n-Hexylurea |
|---|---|---|---|---|
| SBR | | | | |
| Rmax, Nm | 3.76 | 3.38 | 3.89 | 4.21 |
| t2, min. | 14.5 | 10.7 | 13.5 | 6.8 |
| t90-t2, min. | 16.3 | 5.6 | 16.0 | 8.2 |
| t25-t2, min. | 3.7 | 1.6 | 3.5 | 1.4 |
| Max Velocity, %/Min. | 10.0 | 23.3 | 10.0 | 21.5 |
| NATURAL RUBBER | | | | |
| Rmax, Nm | 3.57 | 3.94 | 3.58 | 4.28 |
| t2, min. | 4.8 | 3.5 | 5.3 | 2.7 |
| t90-t2, min. | 7.9 | 5.3 | 8.0 | 5.8 |
| t25-t2, min. | 1.6 | 1.9 | 1.7 | 1.0 |
| Max Velocity, %/Min. | 17.4 | 26.4 | 17.2 | 29.0 |

TABLE I-continued

| ODR DATA AT 153° C. | | | | |
|---|---|---|---|---|
| Type of Rubber | Control | Octylurea | Control | Cyclohexylurea |
| SBR | | | | |
| Rmax, Nm | 3.89 | 4.17 | 3.87 | 4.16 |
| t2, min. | 13.5 | 8.2 | 13.3 | 8.7 |
| t90-t2, min. | 16.0 | 7.1 | 16.4 | 7.8 |
| t25-t2, min. | 3.5 | 1.6 | 3.7 | 2.0 |
| Max Velocity, %/Min. | 10.0 | 21.4 | 10.1 | 20.2 |
| NATURAL RUBBER | | | | |
| Rmax, Nm | 3.58 | 4.20 | 3.60 | 4.26 |
| t2, min. | 5.3 | 2.8 | 5.2 | 3.7 |
| t90-t2, min. | 8.0 | 5.7 | 8.1 | 5.8 |
| t25-t2, min. | 1.7 | 1.0 | 1.6 | 1.1 |
| Max Velocity, %/Min. | 17.2 | 29.3 | 17.1 | 25.5 |

| Type of Rubber | Control | 1,1-Dimethylurea | Control | 1,1-Diethylurea |
|---|---|---|---|---|
| SBR | | | | |
| Rmax, Nm | 3.66 | 4.08 | 3.85 | 4.32 |
| t2, min. | 10.5 | 5.3 | 13.5 | 5.5 |
| t90-t2, min. | 15.0 | 7.2 | 16.2 | 8.2 |
| t25-t2, min. | 2.7 | 1.0 | 3.5 | 1.5 |
| Max Velocity, %/Min. | 10.2 | 24.5 | 10.5 | 21.1 |
| NATURAL RUBBER | | | | |
| Rmax, Nm | 3.71 | 4.45 | 3.61 | 4.59 |
| t2, min. | 5.0 | 3.2 | 5.2 | 2.3 |
| t90-t2, min. | 6.4 | 5.5 | 8.0 | 6.2 |
| t25-t2, min. | 1.0 | 0.8 | 1.6 | 1.0 |
| Max Velocity, %/Min. | 25.5 | 31.1 | 17.1 | 27.6 |

| Type of Rubber | Control | 1,3-Diethylurea | Control | N-(2-Ethyl)-butylurea |
|---|---|---|---|---|
| SBR | | | | |
| Rmax, Nm | 4.10 | 4.23 | 3.88 | 4.23 |
| t2, min. | 15.7 | 8.2 | 13.2 | 7.5 |
| t90-t2, min. | 16.1 | 7.3 | 16.3 | 8.3 |
| t25-t2, min. | 4.1 | 2.0 | 3.6 | 1.5 |
| Max Velocity, %/Min. | 10.2 | 19.9 | 10.0 | 22.2 |
| NATURAL RUBBER | | | | |
| Rmax, Nm | 3.75 | 4.15 | 3.65 | 4.14 |
| t2, min. | 4.8 | 2.6 | 5.0 | 2.8 |
| t90-t2, min. | 7.5 | 6.1 | 8.3 | 6.0 |
| t25-t2, min. | 1.5 | 1.1 | 1.8 | 1.0 |
| Max Velocity, %/Min. | 18.5 | 25.2 | 17.3 | 27.2 |

| Type of Rubber | Control | Methylurea | Control | 1-(2-Pyridyl)urea |
|---|---|---|---|---|
| SBR | | | | |
| Rmax, Nm | 4.00 | 4.00 | 3.90 | 4.40 |
| t2, min. | 15.8 | 4.7 | 15.90 | 9.7 |
| t90-t2, min. | 15.5 | 8.5 | 17.10 | 8.3 |
| t25-t2, min. | 3.4 | 1.2 | 3.70 | 2.1 |
| Max Velocity, %/Min. | 10.8 | 23.0 | 9.80 | 23.5 |
| NATURAL RUBBER | | | | |
| Rmax, Nm | 3.40 | 4.10 | 3.10 | 3.80 |
| t2, min. | 5.0 | 2.7 | 5.20 | 4.2 |
| t90-t2, min. | 7.7 | 6.5 | 6.60 | 7.8 |
| t25-t2, min. | 1.3 | 0.9 | 1.10 | 1.2 |
| Max Velocity, %/Min. | 18.2 | 29.5 | 17.60 | 20.2 |

| Type of Rubber | Control | N-(5-Methyl-2-pyridyl)urea | Control | N-(3-Methyl-2-pyridyl)urea |
|---|---|---|---|---|

TABLE I-continued
ODR DATA AT 153° C.

| SBR | | | | |
|---|---|---|---|---|
| Rmax, Nm | 3.93 | 4.42 | 3.93 | 4.71 |
| t2, min. | 17.0 | 12.0 | 17.0 | 7.5 |
| t90-t2, min. | 17.3 | 9.3 | 17.3 | 13.3 |
| t25-t2, min. | 3.8 | 2.3 | 3.8 | 2.0 |
| Max Velocity, %/Min. | 9.4 | 19.3 | 9.4 | 8.8 |
| NATURAL RUBBER | | | | |
| Rmax, Nm | 3.83 | 4.24 | 3.83 | 4.36 |
| t2, min. | 4.5 | 3.8 | 4.5 | 3.2 |
| t90-t2, min. | 7.8 | 8.3 | 7.8 | 7.8 |
| t25-t2, min. | 1.5 | 1.5 | 1.5 | 1.1 |
| Max Velocity, %/Min. | 17.9 | 18.2 | 17.9 | 20.0 |

| Type of Rubber | Control | N-(4-Methyl-2-pyridyl)urea | Control | 1-(4-Pyridylmethyl)urea |
|---|---|---|---|---|
| SBR | | | | |
| Rmax, Nm | 4.06 | 4.53 | 3.90 | 3.50 |
| t2, min. | 16.2 | 11.7 | 15.9 | 5.7 |
| t90-t2, min. | 16.3 | 9.0 | 17.1 | 10.9 |
| t25-t2, min. | 3.8 | 2.4 | 3.7 | 1.1 |
| Max Velocity, %/Min. | 10.3 | 20.3 | 9.8 | 18.8 |
| NATURAL RUBBER | | | | |
| Rmax, Nm | 3.83 | 4.28 | 3.10 | 3.40 |
| t2, min. | 4.7 | 3.7 | 5.2 | 3.4 |
| t90-t2, min. | 7.6 | 8.2 | 7.6 | 7.9 |
| t25-t2, min. | 1.4 | 1.5 | 1.1 | 1.3 |
| Max Velocity, %/Min. | 18.3 | 18.8 | 17.6 | 17.1 |

| Type of Rubber | Control | N-(3-Dimethylaminopropyl)urea | Control | 1-(2-Pyridylmethyl)urea |
|---|---|---|---|---|
| SBR | | | | |
| Rmax, Nm | 4.09 | 4.19 | 3.90 | 3.70 |
| t2, min. | 16.3 | 4.8 | 15.9 | 4.2 |
| t90-t2, min. | 16.3 | 12.5 | 17.1 | 7.1 |
| t25-t2, min. | 3.9 | 1.7 | 3.7 | 1.0 |
| Max Velocity, %/Min. | 10.0 | 19.2 | 9.8 | 24.8 |
| NATURAL RUBBER | | | | |
| Rmax, Nm | 3.68 | 4.55 | 3.1 | 3.6 |
| t2, min. | 4.4 | 2.0 | 5.2 | 2.8 |
| t90-t2, min. | 7.4 | 6.6 | 7.6 | 7.0 |
| t25-t2, min. | 1.3 | 1.2 | 1.1 | 1.0 |
| Max Velocity, %/Min. | 18.3 | 20.4 | 17.6 | 22.1 |

| Type of Rubber | Control | N-Carbamoyl-piperidine | Control | 1-Methyl-4-carbamoyl-piperidine |
|---|---|---|---|---|
| SBR | | | | |
| Rmax, Nm | 4.09 | 4.63 | 3.88 | 4.30 |
| t2, min. | 14.8 | 4.4 | 13.2 | 6.2 |
| t90-t2, min. | 16.7 | 9.0 | 16.3 | 7.3 |
| t25-t2, min. | 4.4 | 1.3 | 3.6 | 1.5 |
| Max Velocity, %/Min. | 10.1 | 23.9 | 10.0 | 22.5 |
| NATURAL RUBBER | | | | |
| Rmax, Nm | 3.61 | 4.69 | 3.65 | 4.43 |
| t2, min. | 5.2 | 2.1 | 5.0 | 2.3 |
| t90-t2, min. | 8.1 | 5.4 | 8.3 | 5.9 |
| t25-t2, min. | 1.6 | 0.9 | 1.8 | 1.0 |
| Max Velocity, %/Min. | 17.0 | 28.4 | 17.3 | 27.6 |

| | | 1-Phenyl-4-carbamoyl- | | 2-(N-Butylcarbamoyl)-1,2,3,4-tetrahydro- |

| Type of Rubber | Control | piperidine | Control | isoquinoline |
|---|---|---|---|---|
| SBR | | | | |
| Rmax, Nm | 3.66 | 3.94 | 4.18 | 4.17 |
| t2, min. | 10.5 | 6.4 | 14.0 | 9.4 |
| t90-t2, min. | 15.0 | 7.1 | 15.8 | 6.8 |
| t25-t2, min. | 2.7 | 1.1 | 3.7 | 1.5 |
| Max Velocity, %/Min. | 10.2 | 22.0 | 10.8 | 21.4 |
| NATURAL RUBBER | | | | |
| Rmax, Nm | 3.71 | 4.27 | 3.98 | 4.45 |
| t2, min. | 5.0 | 3.0 | 4.7 | 3.2 |
| t90-t2, min. | 6.4 | 5.7 | 7.1 | 5.3 |
| t25-t2, min. | 1.0 | 0.7 | 1.3 | 0.9 |
| Max Velocity, %/Min. | 25.5 | 32.0 | 18.8 | 28.4 |

| Type of Rubber | Control | n-Octadecylurea | Control | N,N'-Didodecylurea |
|---|---|---|---|---|
| SBR | | | | |
| Rmax, Nm | 3.76 | 3.70 | 4.12 | 4.29 |
| t2, min. | 14.5 | 12.0 | 12.5 | 12.5 |
| t90-t2, min. | 16.3 | 9.7 | 16.3 | 13.8 |
| t25-t2, min. | 3.7 | 2.3 | 3.7 | 3.3 |
| Max Velocity, %/Min. | 10.0 | 16.0 | 10.1 | 11.5 |
| NATURAL RUBBER | | | | |
| Rmax, Nm | 3.57 | 3.76 | 3.92 | 4.11 |
| t2, min. | 4.8 | 4.0 | 5.1 | 4.9 |
| t90-t2, min. | 7.9 | 6.0 | 8.2 | 7.8 |
| t25-t2, min. | 1.6 | 1.0 | 1.9 | 1.6 |
| Max Velocity, %/Min. | 17.4 | 23.6 | 17.2 | 17.0 |

| Type of Rubber | Control | (Unsubstituted) urea | Control | N-Carbamoyl morpholine |
|---|---|---|---|---|
| SBR | | | | |
| Rmax, Nm | 4.03 | 4.29 | 4.04 | 4.56 |
| t2, min. | 17.2 | 10.8 | 15.3 | 7.8 |
| t90-t2, min. | 16.5 | 19.8 | 16.0 | 7.9 |
| t25-t2, min. | 3.8 | 3.5 | 4.2 | 1.9 |
| Max Velocity, %/Min. | 9.8 | 11.0 | 10.7 | 20.0 |
| NATURAL RUBBER | | | | |
| Rmax, Nm | 3.70 | 4.00 | 3.78 | 4.55 |
| t2, min. | 4.7 | 4.3 | 4.8 | 2.8 |
| t90-t2, min. | 7.7 | 9.2 | 7.5 | 5.9 |
| t25-t2, min. | 1.5 | 1.5 | 1.5 | 1.0 |
| Max Velocity, %/Min. | 17.4 | 16.0 | 18.4 | 26.2 |

As is apparent from Table I, the use of urea itself had very little effect on natural rubber or synthetic rubber. For example, the t25-t2 time for natural rubber remained the same, that is 1.5, whereas for styrene-butadiene rubber the time was reduced only slightly, that is from 3.8 to 3.5. When the substituted urea coactivators of the present invention were utilized in association with natural rubber, generally only slight improvements were obtained with regard to the cure rate. In distinct contrast thereto, the substituted ureas of the present invention unexpectedly produced vastly improved cure rates, i.e., lower values of t90-t2 as well as t25-t2, when utilized with a styrene-butadiene rubber. Such a result was completely unexpected. Since the substituted urea coactivators had generally little effect in improving the cure rate of natural rubber, it was expected that only minor improvements would be obtained with regard to synthetic rubbers.

While in accordance with the Patent Statutes, the best mode and preferred embodiment has been set forth, the scope of the invention is not limited thereto, but rather by the scope of the attached claims.

What is claimed is:

1. A vulcanizable synthetic rubber composition, comprising:

an uncured synthetic rubber, sulfur, a rubber accelerator, and from about 0.05 to about 10 parts by weight per 100 parts by weight of said sulfur-vulcanizable synthetic rubber of a vulcanization system coactivator, said uncured synthetic rubber being sulfur vulcanizable, said sulfur-vulcanizable synthetic rubber being a butadiene homopolymer, a copolymer of butadiene and a vinyl substituted aromatic comonomer having from 8 to 12 carbon atoms, or an EPDM rubber, said rubber accelerator selected from the class consisting of a thiazole, a sulfenamide, or a thiazole in combination with a thiuram, said coactivator being a substituted urea having the formula $$\begin{array}{c} (R^4)_q \\ \diagdown \\ (R^3)_p \end{array} N-\overset{\overset{\displaystyle O}{\|}}{C}-N \begin{array}{c} (R^1)_m \\ \diagup \\ (R^2)_n \end{array}$$

wherein m is 1 or 0, n is 1, or 0, p is 1 or 0, q is 1 or 0, and m+n+p+q=1, 2, or 3, wherein each $R^1$, $R^2$, $R^3$, and $R^4$, independently, is an aliphatic group, an aromatic group, or combinations thereof, having from 1 to 18 carbon atoms, or an aminoalkyl group having from 1 to 8 carbon atoms, or a pyridyl group, or an alkyl substituted pyridyl group wherein the alkyl substituent contains from 1 to 6 carbon atoms, or a pyridyl substituted alkyl group wherein said alkyl group contains from 1 to 6 carbon atoms; or where $(R^1)_m$ combined with $(R^2)_n$ is -X-, or where $(R^2)_n$ combined with $(R^3)_p$ is -Y-, where said -X- or said -Y- is an alkylene group having from 3 to 18 carbon atoms, or a divalent aliphatic group having from 3 to 18 carbon atoms and containing an oxygen or a nitrogen atom therein, or said oxygen or nitrogen containing divalent aliphatic group having (a) a 1 to 6 carbon atom alkyl substituent, (b) an aromatic substituent, or (c) a 7 to 12 carbon atom alkyl substituted aromatic substituent.

2. A vulcanizable composition according to claim 1, wherein said synthetic rubber is a butadiene homopolymer or a copolymer made from butadiene and a vinyl substituted aromatic comonomer having from 8 to 12 carbon atoms.

3. A vulcanizable composition according to claim 2, wherein each said $R^1$, $R^2$, $R^3$, and $R^4$, independently, are alkyl groups having from 3 to 12 carbon atoms.

4. A vulcanizable composition according to claim 2, wherein the amount of said substituted urea coactivator is from about 0.15 to about 5.0 parts by weight per 100 parts by weight of said vulcanizable rubber.

5. A vulcanizable composition according to claim 4, wherein said substituted urea coactivator is n-butylurea; 1-(2-pyridylmethyl)urea; 1,1-dimethylurea; 1-(2-pyridyl)urea; N-carbamoylpiperidine; amylurea; 1-methyl-4-carbamoylpiperazine; N-(2-ethyl)butylurea; 1-phenyl-4-carbamoylpiperazine; N-hexylurea; N-octylurea; methylurea; t-butylurea; N-(5-methyl-2-pyridyl)urea; 1,1-diethylurea; N-(3-methyl-2-pyridyl)urea; cyclohexylurea; 2-(N-butylcarbamoyl)-1,2,3,4-tetrahydroisoquinoline; N-(4-methyl-2-pyridyl)urea; 1,3-diethylurea; 1-(4-pyridylmethyl)urea; N-(3-dimethylaminopropyl)urea; N-carbamoylmorpholine; N-carbamoylpiperidine; N-ethylurea; propylurea; 1-(2-benzothiazolylthiyl)urea; N-(2-pyridylethyl)urea; N-(4-methyl-2-pyridyl)urea; 1-(3-pyridylmethyl)urea; 3-(N-carbamoylpiperazinyl)propionic acid, butyl ester; N-dodecylurea, 1-(3-pyridyl)urea; 1,3-di-(2-pyridyl)urea; allylurea; 1,3-dimethylurea; or octadecylurea, or combinations thereof.

6. A vulcanizable composition according to claim 5, wherein said substituted urea compound is n-butylurea, t-butylurea, propylurea, amylurea, N-(2-ethyl)butylurea, N-hexylurea, N-octylurea, N-carbamoylpiperidine, N-carbamoylmorpholine, 1-methyl-4-carbamoylpiperazine, 1-phenyl-4-carbamoylpiperazine, N-(5-methyl-2-pyridyl)urea, N-(3-methyl-2-pyridyl)urea, or combinations thereof.

7. A vulcanizable composition according to claim 4, wherein n+p+q=0, where m=1, and wherein $R^1$ is an alkyl group having from 3 to 8 carbon atoms.

8. A vulcanizable composition according to claim 3, wherein said synthetic rubber is polybutadiene or styrene-butadiene rubber.

9. A vulcanizable composition according to claim 6, wherein said synthetic rubber is a polybutadiene or a styrene-butadiene rubber polymerized in solution or in emulsion.

10. A vulcanized synthetic rubber comprising the cured product of claim 1.

11. A vulcanized synthetic rubber comprising the cured product of claim 4.

12. A vulcanized synthetic rubber comprising the cured product of claim 6.

13. A vulcanized synthetic rubber comprising the cured product of claim 2.

14. A vulcanized synthetic rubber comprising the cured product of claim 5.

15. A vulcanized synthetic rubber comprising the cured product of claim 7.

16. A vulcanized synthetic rubber comprising the cured product of claim 8.

17. A vulcanized synthetic rubber comprising the cured product of claim 9.

* * * * *